(12) United States Patent
Yuasa et al.

(10) Patent No.: US 9,398,231 B2
(45) Date of Patent: Jul. 19, 2016

(54) SURVEILLANCE CAMERA TERMINAL

(75) Inventors: Shinya Yuasa, Kyoto (JP); Junichi Nakano, Kusatsu (JP); Takeshi Naito, Ibaraki (JP); Shunsuke Kamijo, Tokyo (JP)

(73) Assignees: Omron Corporation, Kyoto (JP); The University of Tokyo, Tokyo (JP)

( * ) Notice: Subject to any disclaimer, the term of this patent is extended or adjusted under 35 U.S.C. 154(b) by 418 days.

(21) Appl. No.: 13/634,735

(22) PCT Filed: Feb. 7, 2011

(86) PCT No.: PCT/JP2011/052468
§ 371 (c)(1),
(2), (4) Date: Sep. 13, 2012

(87) PCT Pub. No.: WO2011/114799
PCT Pub. Date: Sep. 22, 2011

(65) Prior Publication Data
US 2013/0002869 A1 Jan. 3, 2013

(30) Foreign Application Priority Data
Mar. 15, 2010 (JP) ................................. 2010-056960

(51) Int. Cl.
*G08B 13/00* (2006.01)
*H04N 5/247* (2006.01)
(Continued)

(52) U.S. Cl.
CPC .......... *H04N 5/247* (2013.01); *G08B 13/19608* (2013.01); *G08B 13/19645* (2013.01); *H04N 5/232* (2013.01); *H04N 7/181* (2013.01)

(58) Field of Classification Search
CPC ... H04N 5/247; H04N 5/232; G08B 13/19645

USPC .......................................................... 348/143
See application file for complete search history.

(56) References Cited

U.S. PATENT DOCUMENTS 5,696,503 A * 12/1997 Nasburg ........................ 340/933
6,359,647 B1    3/2002 Sengupta et al.
(Continued)

FOREIGN PATENT DOCUMENTS

JP    2002-092751 A    3/2002
JP    2002-290962 A    10/2002
(Continued)

OTHER PUBLICATIONS

International Search Report w/translation from PCT/JP2011/052468 mailed May 10, 2011 (4 pages).
(Continued)

Primary Examiner — Jeffery Williams
(74) Attorney, Agent, or Firm — Osha Liang LLP

(57) ABSTRACT

A surveillance camera terminal includes an imaging means that outputs a frame image, an imaging visual field control means that changes the imaging visual field of the imaging means in a surveillance area, an object extracting means that extracts an object being imaged by processing the frame image taken by the imaging means, a tracking means that detects a position of the object in the surveillance area based on a position of the object extracted by the object extracting means on the frame image and the imaging visual field of the imaging means, an imaging visual field storage means that stores an imaging visual field, and detection means that detects whether or not the object being tracked by the tracking means has traveled to a position near a handover area for handover of the object to another surveillance camera terminal.

8 Claims, 8 Drawing Sheets

(51) Int. Cl.
*H04N 5/232* (2006.01)
*G08B 13/196* (2006.01)
*H04N 7/18* (2006.01)

(56) References Cited

U.S. PATENT DOCUMENTS

| | | | |
|---|---|---|---|
| 2005/0036036 A1* | 2/2005 | Stevenson et al. | 348/211.99 |
| 2006/0066723 A1 | 3/2006 | Iwase et al. | |
| 2006/0187305 A1* | 8/2006 | Trivedi | G06K 9/00234 348/169 |
| 2008/0198231 A1 | 8/2008 | Ozdemir et al. | |

FOREIGN PATENT DOCUMENTS

| | | |
|---|---|---|
| JP | 2005-33827 A | 2/2005 |
| JP | 2005-244279 A | 9/2005 |
| JP | 2006-310901 A | 11/2006 |
| JP | 2009-017416 A | 1/2009 |

OTHER PUBLICATIONS

Patent Abstracts of Japan, Publication No. 2006-310901 dated Nov. 9, 2006 (1 page).
Patent Abstracts of Japan, Publication No. 2005-033827 dated Feb. 3, 2005 (1 page).
Patent Abstracts of Japan, Publication No. 2005-244279 dated Sep. 8, 2005 (1 page).
Patent Abstracts of Japan, Publication No. 2002-290962 dated Oct. 4, 2002 (1 page).
Supplementary European Search Report issued in corresponding PCT/JP2011/052468 mailed May 2, 2014 (8 pages).

* cited by examiner

SURVEILLANCE CAMERA TERMINAL

TECHNICAL FIELD

The present invention relates to a surveillance camera terminal for use in a wide-area surveillance system configured to track a suspicious individual over a wide area in a place where an unspecified number of people gather such as a station, shopping center, busy streets or a like place.

BACKGROUND ART

Conventionally, a wide-area surveillance system using a plurality of surveillance camera terminals has been used at a station, shopping center, busy streets or a like place where an unspecified number of people gather, in order to detect a person such as a suspicious individual having showed unusual behavior or a like person (hereinafter will be simply referred to as an "object person") and track the object person thus detected. In order to reduce the cost to be incurred for construction of such a system by reducing the number of surveillance camera terminals to be used in the entire system, it has also been a practice to use surveillance camera terminals each of which is capable of changing its imaging visual field with travel of the object person, thereby increasing the surveillance area assigned to each surveillance camera terminal (see Patent Literature 1).

CITATION LIST

Patent Literature

Patent Literature 1: Japanese Patent Laid-Open Publication No. 2006-310901

In a conventional wide-area surveillance system of a typical type, however, each surveillance camera terminal changes its imaging visual field so that the object person to be tracked is imaged as centered in a frame image. That is, the surveillance camera terminal changes its imaging visual field by using the object person as a reference.

Upon entry of the object person being tracked into a handover area set between the surveillance camera terminal and another surveillance camera terminal, the surveillance camera terminal tracking the object person (hereinafter will be referred to as a "handover surveillance camera terminal") transmits a handover request. The handover request is transmitted to another surveillance camera terminal which takes over the tracking of the object person (hereinafter will be referred to as a "takeover surveillance camera terminal").

The takeover surveillance camera terminal changes its imaging visual field to an imaging visual field for use in handover of the object person which is predetermined in relation to the handover surveillance camera terminal. Likewise, the handover surveillance camera terminal changes its imaging visual field to an imaging visual field for use in handover of the object person which is predetermined in relation to the takeover surveillance camera terminal. Then, both of the handover surveillance camera terminal and the takeover surveillance camera terminal image the handover area with substantially the same timing. The takeover surveillance camera terminal identifies the object person being tracked by the handover surveillance camera terminal among persons imaged in a frame image of the handover area. The takeover surveillance camera terminal takes over the tracking of the object person thus identified. The identification of the object person is based on the positions of persons including the object person in frame images taken by the surveillance camera terminals individually.

In this way, both of the handover surveillance camera terminal and the takeover surveillance camera terminal adjust their imaging visual fields to respective imaging visual fields for use in handover of the object person after entry of the object person into the handover area. For this reason, it is possible that the object person has already moved out of the handover area at the time when these surveillance camera terminals image the handover area synchronously. In this case, the surveillance system loses sight of the object person, thus resulting in a failure to track the object person.

An object of the present invention is to provide a surveillance camera terminal which is capable of lowering the possibility of losing sight of an object being tracked at the time of handover of the object to another surveillance camera terminal.

SUMMARY OF THE INVENTION

A surveillance camera terminal according to one or more embodiments of the present invention is constructed as follows.

Imaging visual field control means is configured to change an imaging visual field of imaging means in a surveillance area. Object extracting means is configured to extract an object being imaged by processing a frame image taken by imaging an area in the imaging visual field by the imaging means. Tracking means is configured to detect a position of the object in the surveillance area based on a position of the object extracted by the object extracting means on the frame image and the imaging visual field of the imaging means and then track the object. The tracking means tracks the object based on a change with time in the position of the object in the surveillance area which is obtained by processing frame images in time sequence. The imaging visual field control means changes the imaging visual field of the imaging means in accordance with the position of the object being tracked by the tracking means in the surveillance area. For example, the imaging visual field control means changes the imaging visual field of the imaging means for the object to be substantially centered in the frame image. The imaging visual field control means may change the imaging visual field by predicting the position of the object with use of a displacement vector of the object obtained from a result of tracking of the object by the tracking means.

Imaging visual field storage means is configured to store therein an imaging visual field for use in handover of the object to each of other surveillance camera terminals to which the object is possible to hand over. Detection means is configured to detect whether or not the object being tracked by the tracking means has traveled to a position near a handover area for handover of the object to another surveillance camera terminal. The detection means may be configured to detect whether or not the object has traveled to the position near the handover area for handover of the object to another surveillance camera terminal by the tracking means based on the imaging visual field of the imaging means for example or to detect whether or not the object has traveled to the position near the handover area for handover of the object to another surveillance camera terminal based on the position of the object being tracked by the tracking means. Alternatively, the detection means may be configured to detect whether or not the object has traveled to the position near the handover area for handover of the object to another surveillance camera terminal by the tracking means according to whether or not a predetermined mark painted at a position near the handover area has been detected from a frame image.

When the detection means detects that the object being tracked by the tracking means has traveled to the position near the handover area for handover to another surveillance camera terminal, the imaging visual field control means adjusts the imaging visual field of the imaging means to the imaging visual field for use in handover to the other surveillance camera terminal which is stored in the imaging visual field storage means. At that time, it is preferable that the imaging visual field control means switches the imaging visual field of the imaging means without letting the object person being tracked go out of the frame and adjusts the imaging visual field of the imaging means to the handover area for handover to the other surveillance camera terminal which is stored in the imaging visual field storage means without losing sight of the object.

When the detection means detects that the object being tracked by the tracking means has traveled to the position near the handover area for handover to another surveillance camera terminal, a handover request may be made to the other surveillance camera terminal to which the object has to be handed over. The counterpart surveillance camera terminal to which the object has to be handed over is simply configured to adjust its imaging visual field to an imaging visual field for use in handover of the object in response to the request.

Thus, at the time when the object enters the handover area, both the imaging visual field of the handover surveillance camera terminal and that of the takeover surveillance camera terminal have already been adjusted to the respective imaging visual fields for use in handover. This means that after the entry of the object into the handover area, no time is required for the imaging visual fields of these surveillance camera terminals to be adjusted to the respective imaging visual fields for use in handover of the object. Therefore, the possibility of losing sight of the object being tracked at the time of handover of the object to another surveillance camera terminal can be lowered.

According to one or more embodiments of the present invention, it is possible to lower the possibility of losing sight of an object being tracked at the time of handover of the object to another surveillance camera terminal.

DETAILED DESCRIPTION OF THE INVENTION

Hereinafter, a surveillance camera terminal as an embodiment of the present invention will be described.

Figure 1:
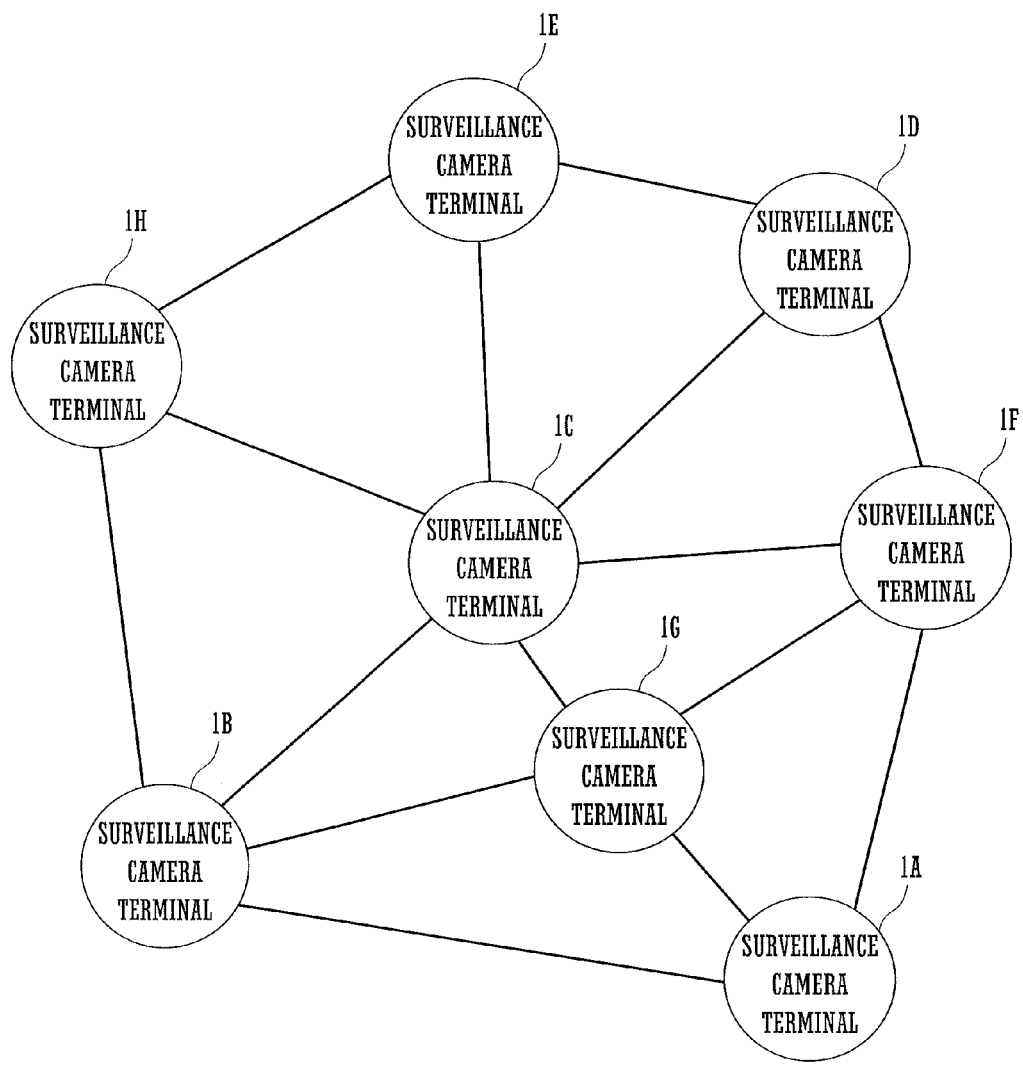
FIG. 1 is a schematic view illustrating the configuration of a wide-area surveillance system according to one or more embodiments.

FIG. 1 is a schematic view illustrating the configuration of a wide-area surveillance system using surveillance camera terminals according to an embodiment of the present invention. The wide-area surveillance system is a network system having a plurality of surveillance camera terminals 1 (1A to 1H). The wide-area surveillance system is an ad hoc network system for example. The surveillance camera terminals 1 are capable of data communication therebetween either directly or via another surveillance camera terminal 1. The data communication between the surveillance camera terminals 1 may be performed wirelessly or wiredly.

The number of surveillance camera terminals 1 forming the wide-area surveillance system is not limited to eight as illustrated in FIG. 1, but may be any plural number. The lines interconnecting the surveillance camera terminals 1 shown in FIG. 1 are links. In the following description, the surveillance camera terminals are denoted by reference numeral 1 particularly when the surveillance camera terminals 1A to 1H are described without distinction therebetween.

Figure 2:
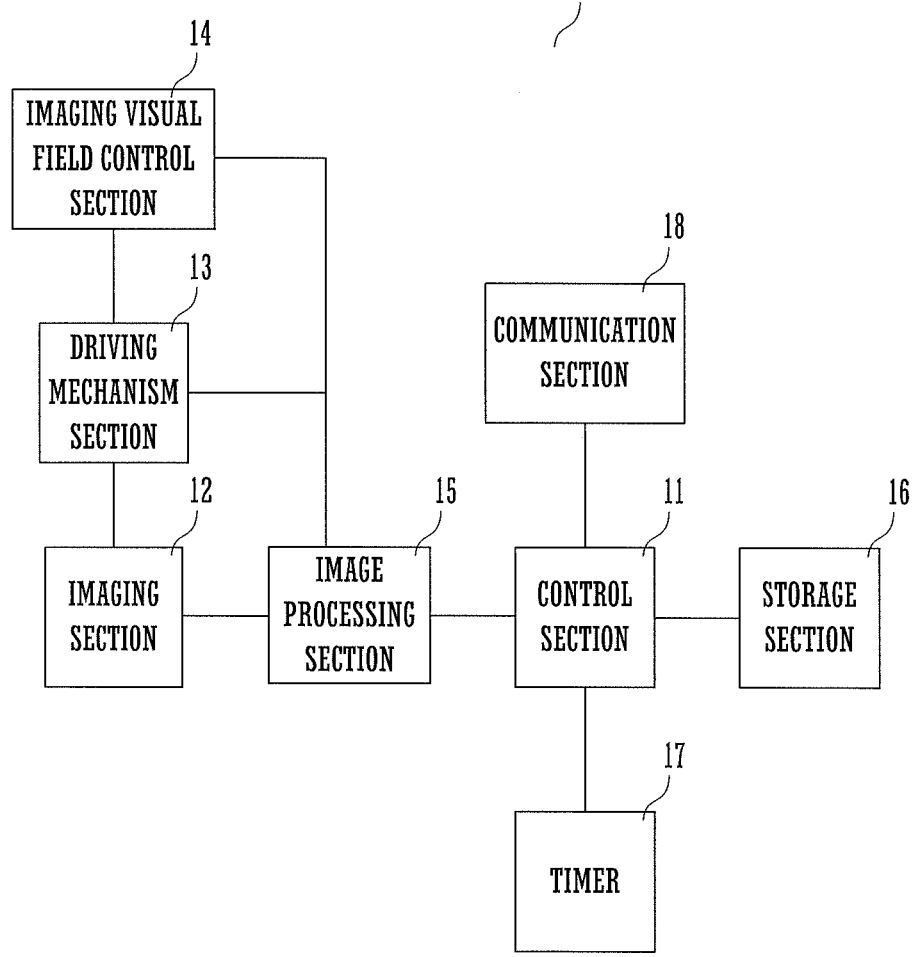
FIG. 2 is a block diagram illustrating the configuration of a relevant portion of a surveillance camera terminal according to one or more embodiments.

FIG. 2 is a diagram illustrating the configuration of a relevant portion of a surveillance camera terminal. The surveillance camera terminal 1 includes a control section 11, an imaging section 12, a driving mechanism section 13, an imaging visual field control section 14, an image processing section 15, a storage section 16, a timer 17, and a communication section 18. The control section 11 controls the operations of different sections of a main body.

The imaging section 12 outputs about 30 frames of frame images per second which are taken by imaging an area in an imaging visual field (i.e., imaging area). The imaging section 12 is mounted on a camera platform (not shown) which is rotatable in the pan direction and in the tilt direction separately. The pan direction and the tilt direction are perpendicular to each other. The imaging section 12 has an optical system driving portion (not shown) for driving an imaging optical system and is capable of changing an imaging magnification Zoom.

The driving mechanism section 13 has a driving source, such as a motor, for rotating the camera platform mounted with the imaging section 12 thereon in the pan direction and in the tilt direction. The driving mechanism section 13 also has a sensor for detecting an angle of rotation θ of the camera platform in the pan direction and an angle of rotation φ of the camera platform in the tilt direction.

The imaging visual field control section 14 instructs the imaging section 12 on the imaging magnification Zoom. According to this instruction, the imaging section 12 changes the imaging magnification Zoom. The imaging visual field control section 14 also instructs the driving mechanism section 13 on the angle of rotation θ of the camera platform mounted with the imaging section 12 thereon in the pan direction and the angle of rotation φ of the camera platform in the tilt direction. According to this instruction, the driving mechanism section 13 varies the angle of rotation θ of the camera platform mounted with the imaging section 12 thereon in the pan direction and the angle of rotation φ of the camera platform in the tilt direction.

Figure 3:
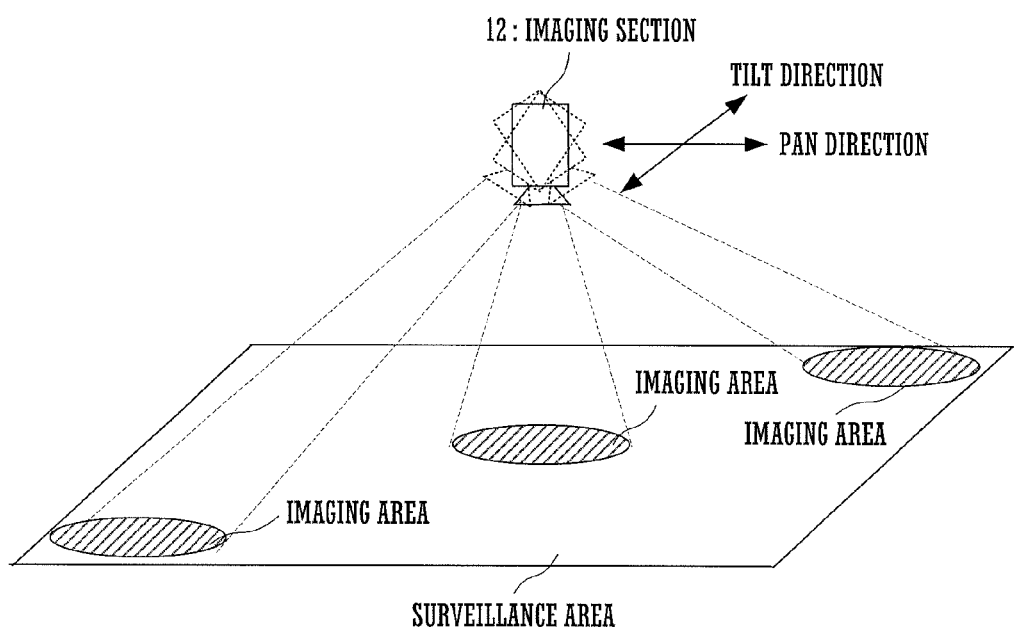
FIG. 3 is a view illustrating a surveillance area assigned to the surveillance camera terminal and an imaging area according to one or more embodiments.

The imaging visual field of the imaging section 12 varies with changes in the angle of rotation θ of the camera platform in the pan direction, the angle of rotation φ of the camera platform in the tilt direction and the imaging magnification Zoom. A surveillance area is predetermined for the surveillance camera terminal 1 as shown in FIG. 3. The surveillance area is a region which can be imaged by the imaging section 12 changing its imaging visual field.

The image processing section 15 processes frame images taken by the imaging section 12 to extract a person being imaged and gives an ID to the person thus extracted. The "ID" is a unique value which can identify a person. The image processing section 15 receives outputs of the sensor detecting the angle of rotation θ of the camera platform mounted with the imaging section 12 thereon in the pan direction and the angle of rotation φ of the camera platform in the tilt direction. That is, the image processing section 15 acquires from the outputs of the sensor the angle of rotation θ of the camera platform mounted with the imaging section 12 thereon in the pan direction and the angle of rotation φ of the camera platform in the tilt direction. The image processing section 15 also acquires the imaging magnification Zoom of the imaging section 12 from a signal indicative of the imaging magnification Zoom inputted from the imaging section 12. The image processing section 15 can acquire the imaging visual field of the imaging section 12, that is, the position of the imaging area in the surveillance area from the angle of rotation θ of the camera platform in the pan direction, the angle of rotation φ of the camera platform in the tilt direction and the imaging magnification Zoom. Therefore, the image processing section 15 can convert the position of a person on each frame image taken by the imaging section 12 to a position in the surveillance area. The image processing section 15 instructs the imaging visual field control section 14 on the imaging visual field of the imaging section 12 in accordance with travel of a person being tracked.

The image processing section 15 is configured to extract a person being imaged and track this person by utilizing a spatio-temporal MRF (Markov Random Field) model for example. As is known, the spatio-temporal MRF model is a spatio-temporal model expanded from an MRF model with attention focused on the correlation between spatio-temporal images in the temporal axis direction. The spatio-temporal MRF model is a model which defines the correlation in the temporal axis direction by dividing the area of each frame image to be subjected to processing into blocks each having several pixels X several pixels (e.g., 8 pixels×8 pixels) and referencing a motion vector throughout temporally successive frame images on a block-by-block basis.

The storage section 16 stores therein an operation program for causing the main body to operate, settings data to be utilized during operation, processing data that occurs during operation, and the like. The timer 17 clocks current time. The communication section 18 controls data communication with another surveillance camera terminal 1.

Figure 4:
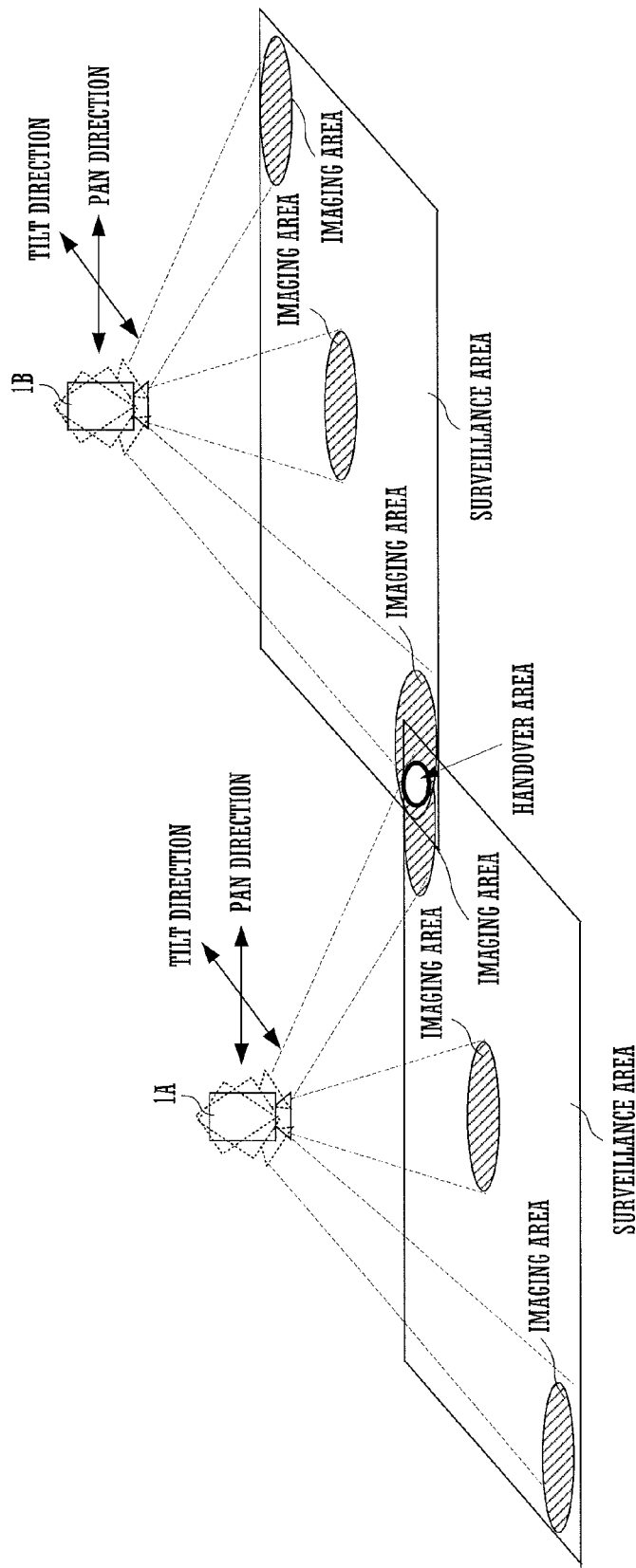
FIG. 4 is a view illustrating the relationship between surveillance areas of adjacent surveillance camera terminals according to one or more embodiments.

The present wide-area surveillance system is a system configured to track a person, such as a suspicious individual having showed unusual behavior or a like person (hereinafter will be simply referred to as an "object person"). Each surveillance camera terminal 1 is assigned a surveillance area as described above. As shown in FIG. 4, the surveillance areas of two adjacent surveillance camera terminals 1A and 1B overlap each other partially. Though FIG. 4 illustratively shows the surveillance areas of the two adjacent surveillance camera terminals 1A and 1B, the surveillance areas of another pair of adjacent surveillance camera terminals 1 also overlap each other partially. The overlapped area is a handover area for handing over the object person from one surveillance camera terminal 1A (or 1B) to the other surveillance camera terminal 1B (or 1A). The handover area is an area for the surveillance camera terminal 1B to identify the object person therein and take over the tracking of the object person from the surveillance camera terminal 1A when, for example, the object person being tracked by the surveillance camera terminal 1A enters the surveillance area of the surveillance camera terminal 1B by passing through the handover area.

For every adjacent surveillance camera terminal 1, the surveillance camera terminal 1 has stored in its storage section 16 the imaging visual field of the imaging section 12 (defined by the angle of rotation θ in the pan direction, the angle of rotation φ in the tilt direction and the imaging magnification Zoom) which is for use in handover of the object person to the adjacent surveillance camera terminal 1 of concern. The imaging visual field of the imaging section 12 for use in handover of the object person is inclusive of the handover area for handing over the object person to a counterpart surveillance camera terminal 1.

For every adjacent surveillance camera terminal 1, each surveillance camera terminal 1 has also stored in its storage section 16 coordinate transformation information indicative of the relative positional relationship between a two-dimensional coordinate system of each frame image taken by imaging the handover area by the imaging section 12 of the subject surveillance camera terminal 1 and a two-dimensional coordinate system of each frame image taken by imaging the handover area by the imaging section 12 of the adjacent counterpart surveillance camera terminal 1. The coordinate transformation information is information for projective transformation of the two-dimensional coordinate system of each frame image taken by the imaging section 12 of the subject surveillance camera terminal 1 with an imaging visual field for use in handover of the object person and the two-dimensional coordinate system of each frame image taken by the imaging section 12 of the adjacent counterpart surveillance camera terminal 1 with an imaging visual field for use in handover of the object person into a common coordinate system. In the present embodiment, the coordinate transformation information stored in the storage section 16 includes first and second coordinate transformation parameters to be described below. The first coordinate transformation parameter is a parameter for projective transformation of the two-dimensional coordinate system of each frame image taken by the imaging section 12 of the subject surveillance camera terminal 1 with the imaging visual field for use in handover of the object person into the two-dimensional coordinate system of each frame image taken by the imaging section 12 of the adjacent counterpart surveillance camera terminal 1 with the imaging visual field for use in handover of the object person. The second coordinate transformation parameter is a parameter for projective transformation of the two-dimensional coordinate system of each frame image taken by the imaging section 12 of the adjacent counterpart surveillance camera terminal 1 with the imaging visual field for use in handover of the object person into the two-dimensional coordinate system of each frame image taken by the imaging section 12 of the subject surveillance camera terminal 1 with the imaging visual field for use in handover of the object person.

The coordinate transformation information may include only one of the first and second coordinate transformation parameters.

Here, description is directed to the first and second coordinate transformation parameters. The first and second coordinate transformation parameters are values calculated using frame images actually taken at the time of installation of the surveillance camera terminals 1.

Initially, upon completion of installation of the surveillance camera terminal 1, four points on the floor surface in the handover area shared with an adjacent counterpart surveillance camera terminal 1 are marked using a tape or the like. Then, a frame image taken by the imaging section 12 of the subject terminal with the imaging visual field for use in handover of the object person is processed to detect coordinates (x, y) of the position of each of the marked four points on the frame image. Similarly, the coordinates (X, Y) of the position of each of the marked four points on a frame image taken by the imaging section 12 of the adjacent counterpart terminal 1 with the imaging visual field for use in handover of the object person are acquired from the counterpart terminal. The coordinates of the position of each of the marked points are substituted into the following equations:

$$X=(a1x+b1y+c1)/(a0x+b0y+1)$$

$$Y=(a2x+b2y+c2)/(a0x+b0y+1),$$

to obtain simultaneous equations with eight unknowns. Eight coefficients: $a0, b0, a1, b1, c1, a2, b2$ and $c2$, which constitute the solution to the simultaneous equations with eight unknowns, form the first coordinate transformation parameter associated with the adjacent counterpart surveillance camera terminal 1. The surveillance camera terminal 1 stores the first coordinate transformation parameter in its storage section 16.

Likewise, the coordinates of the position of each of the marked points are substituted into the following equations:

$$x=(A1X+B1Y+C1)/(A0X+B0Y+1)$$

$$y=(A2X+B2Y+C2)/(A0X+B0Y+1),$$

to obtain simultaneous equations with eight unknowns. Eight coefficients: $A0, B0, A1, B1, C1, A2, B2$ and $C2$, which constitute the solution to the simultaneous equations with eight unknowns, form the second coordinate transformation parameter associated with the adjacent counterpart surveillance camera terminal 1. The surveillance camera terminal 1 stores the second coordinate transformation parameter in its storage section 16.

In identifying a person positioned in the handover area, for each of persons imaged in the handover area of a frame image taken by the subject terminal, the coordinates of his or her position on the frame image are obtained. For each of persons imaged in the handover area of a frame image taken by the counterpart terminal, the coordinates of his or her position on the frame image are acquired from the counterpart terminal. Further, combination patterns are prepared for combining the persons positioned in the handover area imaged by the subject terminal with the persons positioned in the handover area imaged by the counterpart terminal in a one-to-one correspondence. For example, when two persons are positioned in the handover area, the number of such combination patterns prepared here is two. When three persons are positioned in the handover area, the number of such combination patterns prepared here is six.

For each of the persons positioned in the handover area imaged by the subject surveillance camera terminal 1, the subject terminal 1 transforms the coordinates of the position of the person of concern into the coordinate system of the counterpart terminal by using the first coordinate transformation parameter. For each of the person combination patterns, the surveillance camera terminal 1 calculates a first distance energy which is the sum total of distances between the corresponding persons in the coordinate system of the counterpart terminal. For each of the persons positioned in the handover area imaged by the counterpart terminal, the subject surveillance camera terminal 1 transforms the coordinates of the position of the person of concern into the coordinate system of the subject terminal by using the second coordinate transformation parameter. For each of the person combination patterns, the subject surveillance camera terminal 1 calculates a second distance energy which is the sum total of distances between the corresponding persons in the coordinate system of the subject terminal.

Subsequently, the surveillance camera terminal 1 determines that a combination pattern such that the sum of the first distance energy and the second distance energy is the smallest of all the combinations of the persons positioned in the handover area is a proper correspondence between the persons positioned in the handover area. Therefore, when the object person is positioned in the handover area, identification of the object person can be made.

Figure 5:
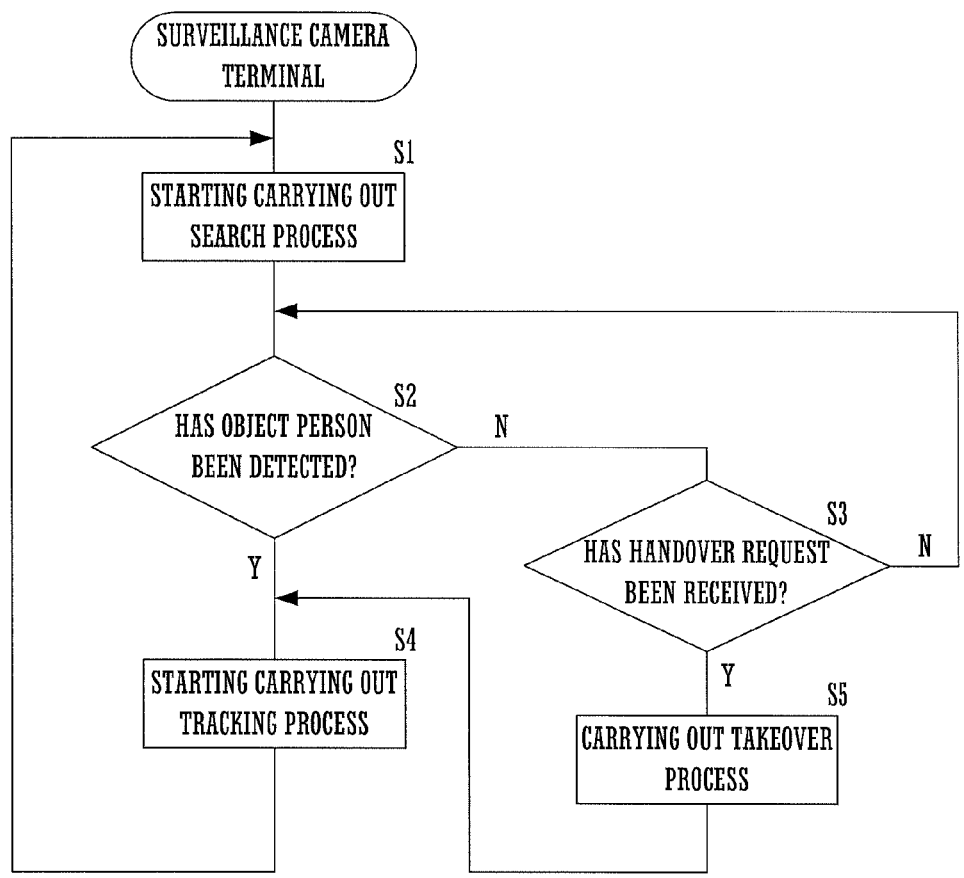
FIG. 5 is a flowchart of an operation of a surveillance camera terminal according to one or more embodiments.

The following description is directed to the operation of the surveillance camera terminal 1. FIG. 5 is a flowchart of an operation of the surveillance camera terminal 1. The surveillance camera terminal 1 starts carrying out a search process for searching the surveillance area for the object person (step S1). At that time, the surveillance camera terminal 1 does not yet track the object person (which means that the terminal 1 does not yet carry out a tracking process to be described later). The surveillance camera terminal 1 waits until detection of the object person in the surveillance area (step S2) or until receipt of a request of handover of the object person from an adjacent surveillance camera terminal 1 (step S3).

In the search process started in step S1, the imaging visual field of the imaging section 12 is changed at fixed time intervals (several seconds). Specifically, the imaging visual field control section 14 instructs the driving mechanism section 13 on an angle of rotation θ of the camera platform mounted with the imaging section 12 thereon in the pan direction and an angle of rotation ϕ of the camera platform in the tilt direction at fixed time intervals based on predetermined conditions. For example, these conditions are predetermined so that the imaging visual field of the imaging section 12 scans over the surveillance area. The imaging magnification Zoom is a predetermined imaging magnification.

The image processing section 15 processes a frame image taken by the imaging section 12 to extract persons imaged and gives an ID to each of the persons thus extracted. At that time, any ID is not given to a person already given an ID. For each of the persons extracted, the image processing section 15 prepares an object map which makes his or her ID correspond with his or her position in the surveillance area. The object map is given a time stamp indicative of the time at which the timer 17 clocked upon preparation of the object map. The image processing section 15 uses temporally successive object maps to analyze the behavior of each of the persons given respective IDs. If there is a person showing unusual behavior, that person is detected as the object person. Alternatively, it is possible that with the facial image of a marked person having been registered, the marked person is detected by collating the facial image of a person taken by the imaging section 12 with the facial image of the marked person and is then determined as the object person.

Figure 6:
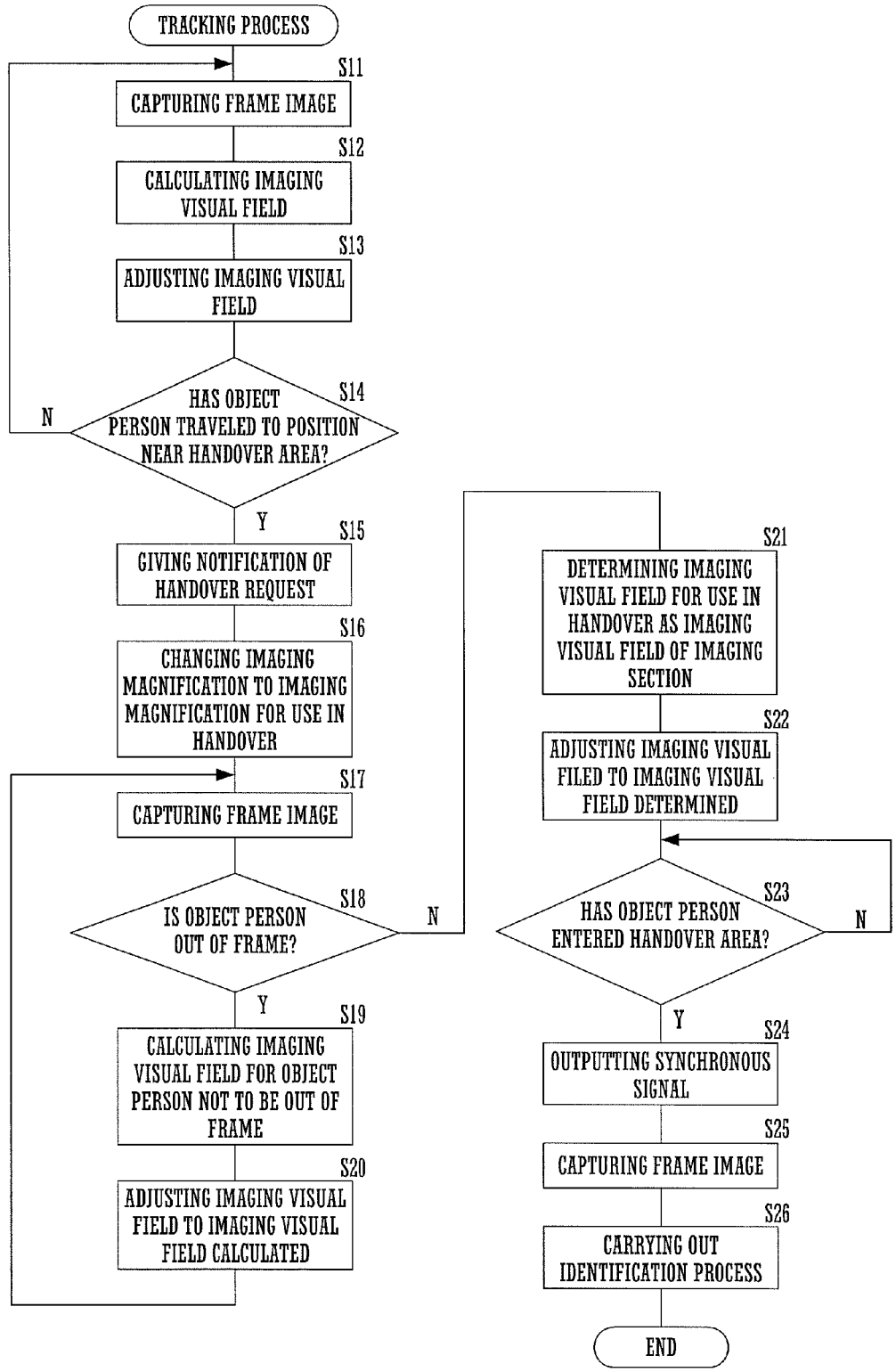
FIG. 6 is a flowchart of a tracking process according to one or more embodiments.
Figure 7:
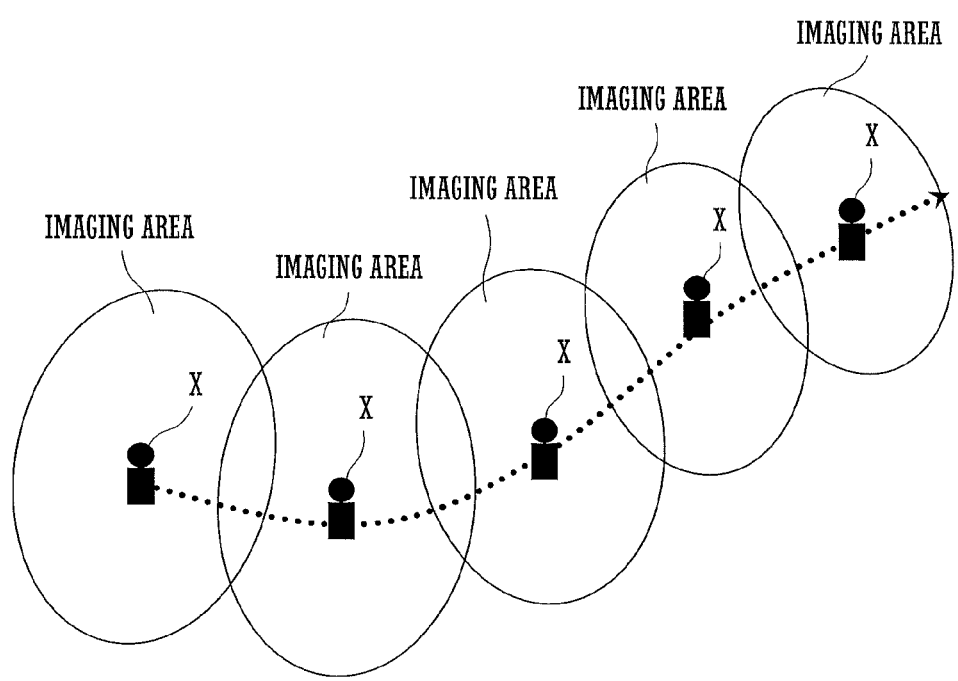
FIG. 7 is a view illustrating images taken during the tracking process according to one or more embodiments.

Upon detection of the object person, the surveillance camera terminal 1 starts carrying out the tracking process (step S4). FIG. 6 is a flowchart of the tracking process. The image processing section 15 captures a frame image taken by the imaging section 12 (step S11), processes the frame image, and calculates an imaging visual field (i.e., an angle of rotation θ of the camera platform in the pan direction and an angle of rotation ϕ of the camera platform in the tilt direction) with which the object person is centered in the imaging section 12 (step S12). At that time, the imaging magnification Zoom of the imaging section 12 is a predetermined imaging magnification.

The surveillance camera terminal 1 adjusts the imaging visual field of the imaging section 12 to that calculated in step S12 (step S13). That is, the angle of rotation θ of the camera platform in the pan direction and the angle of rotation φ of the camera platform in the tilt direction are adjusted to the respective angles calculated in step S12. Specifically, the image processing section 15 notifies the imaging visual field control section 14 of the angle of rotation θ of the camera platform in the pan direction and the angle of rotation φ of the camera platform in the tilt direction which have been calculated thereby. The imaging visual field control section 14 causes the driving mechanism section 13 to change the angle of rotation θ of the camera platform in the pan direction and the angle of rotation φ of the camera platform in the tilt direction based on the notification.

The surveillance camera terminal 1 determines whether or not the object person has traveled to a position near the handover area shared with another surveillance camera terminal 1 located adjacent thereto (step S14). If it is not determined by the surveillance camera terminal 1 that the object person has traveled to the position near the handover area shared with the adjacent counterpart surveillance camera terminal 1, the surveillance camera terminal 1 returns the process to step S11 to repeat the operations described above.

By repeating the operations of steps S11 to S14, the surveillance camera terminal 1 can track the object person X while making the object person X substantially centered in the imaging visual field of the imaging section 12. Even during the tracking process, the image processing section 15 prepares an object map which makes the ID of the object person correspond with the position of the object person in the surveillance area. The use of the object map allows a displacement vector defined by the direction and speed of travel of the object person to be obtained.

If it is determined by the surveillance camera terminal 1 that the object person has traveled to the position near the handover area shared with the counterpart surveillance camera terminal 1 located adjacent thereto, the surveillance camera terminal 1 transmits a request for handover of the object person to the adjacent counterpart surveillance camera terminal 1 (step S15). In step S14, the surveillance camera terminal 1 determines whether or not the object person has traveled to the position near the handover area shared with the counterpart surveillance camera terminal 1 located adjacent thereto based on the imaging visual field of the imaging section 12 for use in handover of the object person to the adjacent counterpart surveillance camera terminal 1 and the current imaging visual field. Specifically, the surveillance camera terminal 1 determines that the object person has traveled to the position near the handover area shared with the adjacent counterpart surveillance camera terminal 1 when the two conditions:

$$\phi 1 - V \leq \phi t \leq \phi 1 + V \qquad (a)$$

(where V represents a vertical angle of view formed when the imaging visual field is z1); and $$\theta 1 - H \leq \phi t \leq \theta 1 + H/2 \qquad (b)$$

(where H represents a horizontal angle of view formed when the imaging visual field is z1), are both satisfied provided that the imaging visual field of the imaging section 12 for handover of the object person to the adjacent counterpart surveillance camera terminal 1 is defined by an angle of rotation (θ1) of the camera platform in the pan direction, an angle of rotation (φ1) of the camera platform in the tilt direction and an imaging magnification (z1) while the current imaging visual field of the imaging section 12 is defined by an angle of rotation (θt) of the camera platform in the pan direction, an angle of rotation (φt) of the camera platform in the tilt direction and an imaging magnification (zt).

Alternatively, the surveillance camera terminal 1 may be configured to determine that the object person has traveled to the position near the handover area shared with the adjacent counterpart surveillance camera terminal 1 in response to detection of an appropriate mark having been printed on a floor surface lying outside the handover area during processing of an image taken by the imaging section 12 by the image processing section 15. Instead of such a mark, use may be made of a structure or the like which is located near and outside the handover area. Yet alternatively, determination may be made based on the position of the object person being tracked in the surveillance area.

The handover surveillance camera terminal 1 changes the imaging magnification Zoom to z1 (i.e., the imaging magnification for use in handover) after the request for handover of the object person has been made in step S15 (step S16). The image processing section 15 captures and processes a frame image taken by the imaging section 12 (step S17) and determines whether or not the object person is out of the frame when the imaging visual field of the imaging section 12 is changed to the imaging visual field for use in handover (step S18). If it is determined by the surveillance camera terminal 1 that the object person is out of the frame in step S18, the surveillance camera terminal 1 calculates an imaging visual field (i.e., an angle of rotation θ of the camera platform in the pan direction and an angle of rotation φ of the camera platform in the tilt direction) which can accommodate the object person therein (step 19). Though an imaging visual field which centers the object person therein may be calculated in step S19, an imaging visual field close to the imaging visual field for use in handover in which the object person is shifted from the center is preferably calculated. The surveillance camera terminal 1 adjusts the imaging visual field of the imaging section 12 to that calculated in step S19 (step S20) and then returns the process to step 17.

If it is not determined by the surveillance camera terminal 1 that the object person is out of the frame in step S18, the imaging visual field for use in handover which is stored in the storage section 16 is determined as the imaging visual field of the imaging section 12 (step S21). The surveillance camera terminal 1 adjusts the imaging visual field of the imaging section 12 to the imaging visual field for use in handover (step S22).

In this way, the surveillance camera terminal 1 changes the imaging visual field of the imaging section 12 by using the object person as a reference (for the object person to be centered in the imaging visual field) when the object person is not positioned near the handover area between the surveillance camera terminal 1 and another surveillance camera terminal 1 located adjacent thereto. When the object person is positioned near the handover area between the surveillance camera terminal 1 and the adjacent surveillance camera terminal 1, the surveillance camera terminal 1 changes the imaging visual field of the imaging section 12 by using the imaging visual field for use in handover as a reference. Therefore, the imaging visual field of the imaging section 12 has already been adjusted to the imaging visual field for use in handover at the time when the object person enters the handover area.

The adjacent surveillance camera terminal 1 having received the object person handover request made in step S15 starts carrying out a takeover process (step S5). The adjacent surveillance camera terminal 1 takes over the tracking of the object person. Hereinafter, the counterpart surveillance camera terminal 1 which takes over the tracking of the object person will be referred to as a "takeover surveillance camera terminal 1". The surveillance camera terminal 1 which has transmitted the object person handover request in step S15 will be referred to as a "handover surveillance camera terminal 1".

Figure 8:
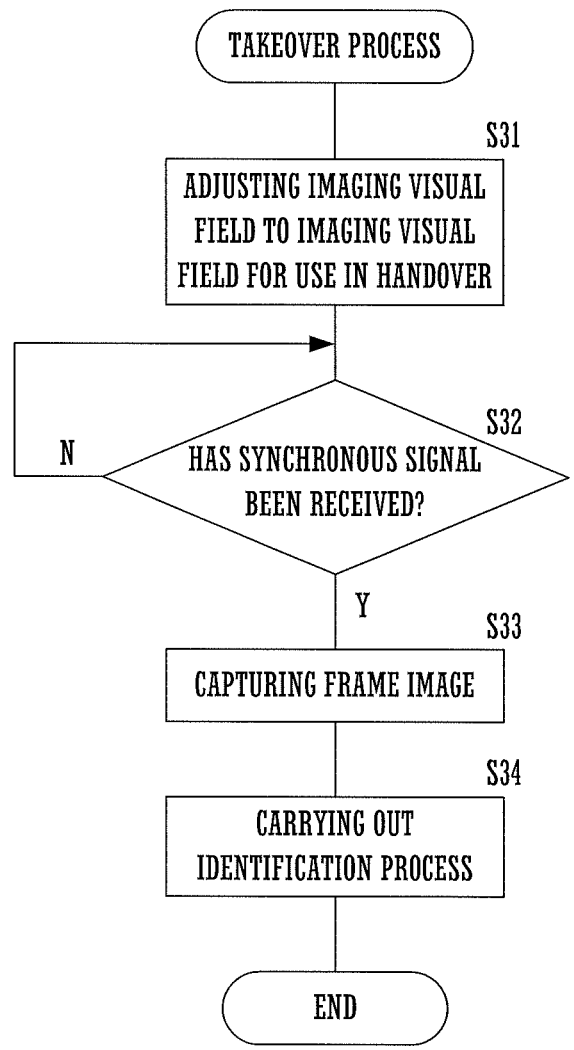
FIG. 8 is a flowchart of a takeover process according to one or more embodiments.

FIG. 8 is a flowchart of the takeover process carried out by the takeover surveillance camera terminal. The takeover surveillance camera terminal 1 adjusts the imaging visual field of the imaging section 12 to an imaging visual field for use in handover of the object person from the surveillance camera terminal 1 located adjacent thereto which has transmitted the handover request received this time (step S31). Specifically, upon receipt of the handover request, the takeover surveillance camera terminal 1 adjusts the imaging visual field of the imaging section 12 to the imaging visual field for use in handover of the object person from the handover surveillance camera terminal 1.

The takeover surveillance camera terminal 1 waits for a synchronous signal from the handover surveillance camera terminal 1 (step S32).

After the handover surveillance camera terminal 1 has adjusted the imaging visual field of the imaging section 12 to the imaging visual field for use in handover of the object person to the takeover surveillance camera terminal 1 in step S22, the handover surveillance camera terminal 1 waits for the object person to enter the handover area (step S23). Upon entry of the object person into the handover area, the handover surveillance camera terminal 1 transmits the synchronous signal to the takeover surveillance camera terminal 1 (step S22). The synchronous signal may be a signal for notification of a time or for notification of simple reference timing.

The handover surveillance camera terminal 1 which hands over the object person and the takeover surveillance camera terminal 1 which takes over the object person capture frame images taken by their respective imaging sections 12 with timing based on the synchronous signal (steps S25 and S33). The takeover surveillance camera terminal 1 as well as the handover surveillance camera terminal 1 identifies the object person being imaged based on the images taken by imaging the handover area (steps S26 and S34). The identification of the object person can be simply made by the technique using the aforementioned first and second distance energies.

The takeover surveillance camera terminal 1 completes the takeover process and then starts carrying out the aforementioned tracking process in step S4. The handover surveillance camera terminal 1, on the other hand, returns the process to step S1 after the tracking process in step S4 has been completed.

Thus, at the time of entry of the object person into the handover area, the imaging section 12 of the handover surveillance camera terminal 1 and that of the takeover surveillance camera terminal 1 have their respective imaging visual fields which have been already adjusted to the respective predetermined imaging visual fields for use in handover. This means that after the entry of the object person into the handover area, no time is required for the imaging visual fields of these surveillance camera terminals 1 to be adjusted to the respective imaging visual fields for use in handover of the object person. Therefore, the possibility of losing sight of the object being tracked at the time of handover of the object person to another surveillance camera terminal 1 can be lowered.

Although the disclosure has been described with respect to only a limited number of embodiments, those skilled in the art, having benefit of this disclosure, will appreciate that other embodiments can be devised which do not depart from the scope of the present disclosure. Accordingly, the scope of the present disclosure should be limited only by the attached claims.

REFERENCE SIGNS LIST

1(1A to 1H) surveillance camera terminal
11 control section
12 imaging section
13 driving mechanism section
14 imaging visual field control section
15 image processing section
16 storage section
17 timer
18 communication section

The invention claimed is:

1. A surveillance camera terminal comprising:
imaging means configured to output a frame image obtained by imaging an area in an imaging visual field;
imaging visual field control means configured to change the imaging visual field of the imaging means in a surveillance area;
object extracting means configured to extract a first object to be tracked, from one or more objects imaged in the frame image;
tracking means configured to detect a position of the first object in the surveillance area based on a position of the first object extracted, by the object extracting means, from the frame image and the imaging visual field and then track the first object;
imaging visual field storage means configured to store an imaging visual field of the imaging means imaging a handover area in which the first object is positioned when the first object is handed over to each of other surveillance camera terminals to which the first object is possible to be handed over;
identification means configured to:
projective-transform a first handover frame image and a second handover frame image into a common coordinate system, the first handover frame image being obtained by the imaging means imaging the handover area with the imaging visual field of another surveillance camera terminal to which the first object is handed over, that is stored in the imaging visual field storage means and the second handover frame image being obtained by the another surveillance camera terminal imaging the handover area with the imaging visual field used when the first object is handed over between the surveillance camera terminal and the another surveillance camera terminal, and
identify the first object included in one or more second objects imaged in the hand over area by associating, on a one-to-one-basis, the second objects imaged in the handover area between the first handover frame image and the second handover frame image based on a position of each of the second objects in the first handover frame image and a position of each of the second objects in the second handover frame image that have been projective-transformed into the common coordinate system; and
detection means configured to detect whether or not the first object that is being tracked by the tracking means has traveled to a position near the handover area for handover of the first object to the another surveillance camera terminal,
wherein the imaging visual field control means changes the imaging visual field of the imaging means in accordance with the position of the first object that is being tracked by the tracking means in the surveillance area, and wherein, when the detection means detects that the first object that is being tracked by the tracking means has traveled to the position near the handover area for handover to the another surveillance camera terminal, the imaging visual field control means adjusts the imaging visual field of the imaging means to the imaging visual field of the another surveillance camera terminal, that is stored in the imaging visual field storage means.

2. The surveillance camera terminal according to claim 1, wherein when the detection means detects that the first object that is being tracked by the tracking means has traveled to the position near the handover area for handover to the another surveillance camera terminal, the imaging visual field control means changes the imaging visual field of the imaging means to the imaging visual field in which the handover area in which the first object is handed over is imaged while capturing the first object in the imaging visual field of the imaging means.

3. The surveillance camera terminal according to claim 1, further comprising synchronization means configured to synchronize timing for imaging by the imaging means to timing for imaging by the another surveillance camera terminal to which the first object has to be handed over.

4. The surveillance camera terminal according to claim 1, further comprising handover request notification means configured to make a handover request to the another surveillance camera terminal to which the first object has to be handed over when the detection means detects that the first object that is being tracked by the tracking means has traveled to the position near the handover area for handover to the another surveillance camera terminal.

5. The surveillance camera terminal according to claim 4, wherein when the handover request is received from the another surveillance camera terminal, the imaging visual field control means adjusts the imaging visual field of the imaging means to the imaging visual field of the another surveillance camera terminal, that is stored in the imaging visual field storage means.

6. The surveillance camera terminal according to claim 2, further comprising synchronization means configured to synchronize timing for imaging by the imaging means to timing for imaging by the another surveillance camera terminal to which the first object has to be handed over.

7. The surveillance camera terminal according to claim 2, further comprising handover request notification means configured to make a handover request to the another surveillance camera terminal to which the first object has to be handed over when the detection means detects that the first object that is being tracked by the tracking means has traveled to the position near the handover area for handover to the another surveillance camera terminal.

8. The surveillance camera terminal according to claim 3, further comprising handover request notification means configured to make a handover request to the another surveillance camera terminal to which the first object has to be handed over when the detection means detects that the first object that is being tracked by the tracking means has traveled to the position near the handover area for handover to the another surveillance camera terminal.

* * * * *